United States Patent
Kanter

(12) 
(10) Patent No.: US 6,572,952 B1
(45) Date of Patent: *Jun. 3, 2003

(54) SHOCK ABSORBING CARPET SYSTEM

(76) Inventor: Ray D. Kanter, 10723 Preston Rd. #243, Dallas, TX (US) 75230

( * ) Notice: Subject to any disclaimer, the term of this patent is extended or adjusted under 35 U.S.C. 154(b) by 93 days.

This patent is subject to a terminal disclaimer.

(21) Appl. No.: 09/617,206

(22) Filed: Jul. 17, 2000

Related U.S. Application Data

(63) Continuation-in-part of application No. 08/971,524, filed on Nov. 17, 1997, now Pat. No. 6,090,462.

(51) Int. Cl.[7] ................................................. B32B 3/02
(52) U.S. Cl. ..................... 428/192; 296/39.1; 296/39.2; 428/95; 428/96; 428/194
(58) Field of Search ............................... 428/40.1, 41.8, 428/95, 96, 192, 194; 296/39.1, 39.2

(56) References Cited

U.S. PATENT DOCUMENTS 3,577,894 A * 5/1971 Emerson ........................ 404/31
3,616,138 A * 10/1971 Wentworth ..................... 428/96
4,306,388 A * 12/1981 Yuter ............................... 52/6
4,522,857 A * 6/1985 Higgins ........................... 428/95

* cited by examiner

*Primary Examiner*—Nasser Ahmad
(74) *Attorney, Agent, or Firm*—Morgan L. Crow, P.E

(57) ABSTRACT

A carpet mat assembly with shock absorbing properties includes a mat made of closed cell foam sections. The mat sections are sized to be readily portable, preferably 4 foot by 6 foot in size. The mat thickness is selected to conform to ASTM F1292-99. Preferably, the mat thickness is 1⅛" thick. The mat section may be coated with a pressure sensitive adhesive covering on one side of the mat. The pressure sensitive adhesive is covered with a removable liner. The liner is removed to expose the pressure sensitive adhesive. Carpet is applied to the coated surface of the mat and the pressure sensitive adhesive bonds the carpet to the mat. The outer perimeters of each mat may be lined with a hook and pile fastener such as 3M Velcro® for attaching multiple sections of the carpet mat assembly securely together. On the outer perimeter of mat sections not joined to other mat sections, an edge molding preferably made from the same closed cell foam may be integral, or may be attached to the mat with a contact adhesive, or by other means. The completed assembly provides a floor or ground surface safe for playgrounds, schools, child care centers, martial arts, gymnasiums or other areas where shock absorbing surfaces are required.

2 Claims, 2 Drawing Sheets

SHOCK ABSORBING CARPET SYSTEM

CROSS-REFERENCE TO RELATED APPLICATIONS

This is a Continuation in Part of patent application Ser. No. 08/971,524, filed Nov. 17, 1997, now U.S. Pat. No. 6,090,462.

BACKGROUND OF THE INVENTION

Related Prior Art

In U.S. Pat. No. 5,658,430 issued to Drake and Herrin in 1997 there is illustrated new wall to wall carpeting applied directly over worn carpeting having a backing secured to a hard floor surface, by spraying an adhesive onto the top pile surface of the old carpet.

In U.S. Pat. No. 4,647,484 issued to Higgins in 1983 there is illustrated an underlay for carpets having a scrim supported lower foam rubber portion and a Mylar® upper portion having adhesive on both sides to provide an attachment to the lower portion and an adhesive upper portion for attachment to a carpet tile. The upper portion is protected by a release paper, which is removed before installation.

In U.S. Pat. No. 5,304,268 issued to Hoopengardner in 1994 there is illustrated a carpet pad having a pressure sensitive adhesive for retaining the carpet and pad in place on a floor.

In U.S. Pat. No. 4,990,399 issued to Hoopengardner in 1991 there is illustrated a carpet cushion of compressible foam having a pressure sensitive adhesive applied for retaining the carpet and pad in place on a floor, and having a spacer element laid into the adhesive after the adhesive is applied.

In U.S. Pat. No. 4,804,567 issued to Reuben in 1989 there is illustrated an automobile carpet having a carpet pad attaching means removably connected by a pressure sensitive adhesive.

In U.S. Pat. No. 4,797,170 issued to Hoopengardner in 1989 there is illustrated a carpet and pad with a pressure sensitive adhesive on one surface.

In U.S. Pat. No. 4,557,774 issued to Hoopengardner in 1989 there is illustrated a carpet and pad with a pressure sensitive adhesive on its upper and lower surface.

In U.S. Pat. No. 5,160,770 issued to Hoopengardner in 1992 there is illustrated a carpet and pad with a sealed surface and pressure sensitive adhesive applied to one or both sealed surfaces of the pad. Also illustrated is application of a hot melt pressure sensitive adhesive onto an unsealed pad surface.

FIELD OF THE INVENTION

In the installation of carpeting, it is known to place a carpet mat made of urethane foam or other open cell compressible material between the carpet and the floor. It is also known to use a pressure sensitive adhesive to bond the carpet to the carpet mat, and/or to bond the carpet mat to the floor. These inventions have been applied to wall to wall carpet systems. Because of the permeability of conventional carpet mat materials, undesirable wicking of the adhesive material into the mat occurs. Additionally, conventional systems are designed for comfortable walking, but provide inadequate protection during a fall.

It is desirable to eliminate the problem of wicking of adhesive material into the compressible material of the carpet mat. It is also desirable to develop a shock absorbing carpet system that protects people from injury in the event of a fall, where activity is such that a fall is likely. Places where the likelihood of a fall exists often host a variety of different events, or the use of a space of multiple utility, with varying requirements for the size and design of the flooring. Accordingly, there is a need for a shock absorbing carpet mat assembly that is both portable and configurable, into a variety of shapes and sizes.

BRIEF SUMMARY OF THE INVENTION

A carpet assembly with shock absorbing properties for preventing injury comprising a mat of closed cell foam composition having shock damping properties and having a top side and a bottom side and predetermined thickness and perimeter edges connecting the top side and the bottom side; a layer of adhesive which may be pressure sensitive adhesive covering the top side of the mat, a layer of carpet having a top side and a bottom side, the bottom side of the carpet being fastened in contact with the an adhesive which may be pressure sensitive adhesive for adherence thereto. Preferably, the mat is substantially 1⅛ inch thick. The present invention is directed to the problem of safety in the design of flooring where people are likely to fall down, such as, playgrounds, child care centers, gymnasiums, and the like. These areas often require portability of such flooring systems, size variation, and reconfiguration of the shape of the system, as the nature of the events may demand. The present invention may be installed wall to wall or as a portable system to cover only an area as required for an activity such as gymnastics. By incorporating a mat with an impact attenuation that satisfies ASTM F-1292-99, the present invention provides a safe flooring system for a variety of applications where people are likely to fall down. The present invention eliminates undesirable wicking of the adhesive and the need for intermediate sealing systems, by using a closed cell carpet mat, which allows direct application of the adhesive.

DETAILED DESCRIPTION

The American Society for Testing and Materials has issued ASTM F-1292-99 Standard Specification for Impact Attenuation of surface Systems Under and Around Playground Equipment. This specification limits the maximum impact force to 200 times the force of gravity, from a specified height. My carpet mat assembly in the preferred embodiment limits a fall from 48 inches to the specified impact limit. Applications of carpet mats need to be adapted to the potential fall distance of a person walking on the mat, or on top of any equipment above the mat.

Figure 1:
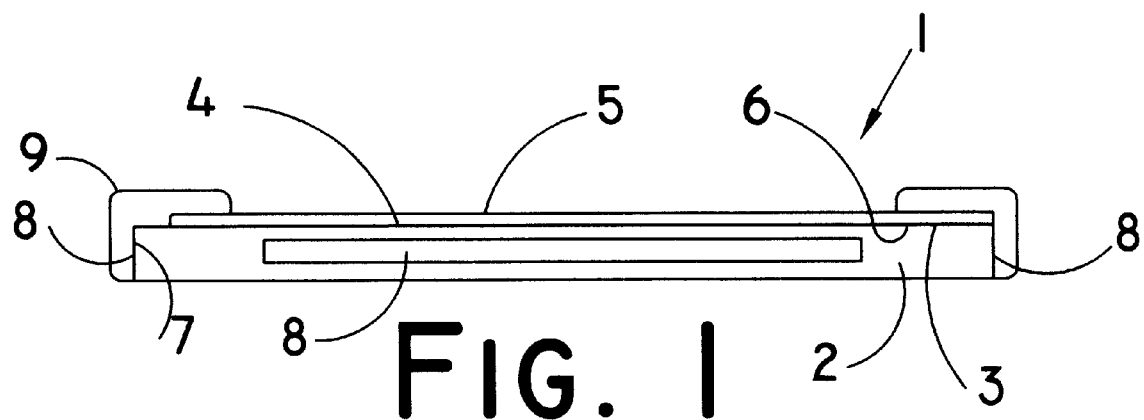
FIG. 1 is a cross-sectional view of a shock absorbing carpet mat assembly formed in accordance with this invention.

FIG. 1 is a cross-sectional view of a shock absorbing carpet mat assembly 1. The assembly includes a mat section 2 made of a closed cell material. In the preferred embodiment, mat section 2 has a thickness of 1⅛" or other as necessary to meet ASTM F-1292-99. Variations in density and hardness of the mat, however, may allow a mat as thin as ½". I believe that with present materials, the mat should be at least ½" thick. In the preferred embodiment, mat section 2 is made in sections 4'×6'. The top side 3 of the mat section 2, is coated with a layer of adhesive 4. Prior to assembly, if pressure sensitive adhesive is used, the pressure sensitive adhesive 4 is covered with a removable liner (not shown) on the side opposite the mat section 2 to protect the pressure sensitive adhesive 4 from contact with any other surface during shipping and handling. The removable liner is removed to expose the surface of the pressure sensitive adhesive 4 prior to installation of the carpet 5. To install the carpet 5, the bottom side of the carpet 6 is place in direct contact with the adhesive 4 and bonded thereto. The perimeter edges 7 of the mat section 2 may have a hook and loop fastener such as 3M Velcro® 8 attached. The hook and loop fastener 8 allows easy attachment of other mat sections to create a larger, removable, protective floor surface. The hook and pile fastener such as 3M Velcro® 8 also allows attachment of edge molding 9. The edge molding 9 provides a perimeter of the shock absorbing carpet mat assembly 1 that is both aesthetically appealing and protective. Alternatively, edge molding 9 can be permanently attached to mat section 2 and carpet 5, with a contact cement or other adhesive.

Figure 2:
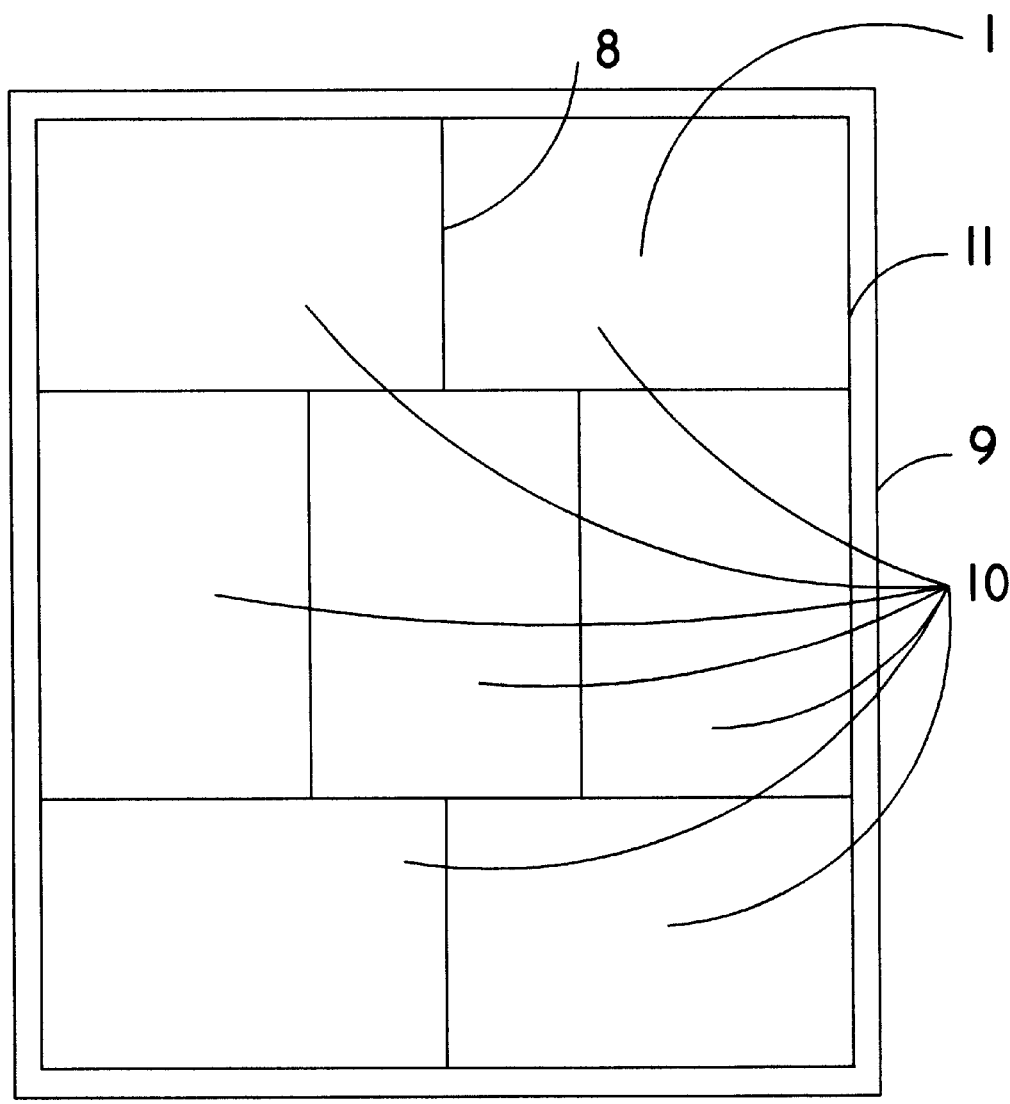
FIG. 2 is a top view of a shock absorbing carpet mat assembly showing multiple sections attached together in accordance with this invention.

FIG. 2 is a top view of a shock absorbing carpet mat assembly 1 showing multiple sections 10 attached contiguously together. The sections are attached by means of the hook and pile fastener such as 3M Velcro® 8 along the perimeter edges 7 of each mat section 2. If the multiple sections 10 do not complete a carpet assembly that is wall to wall in a room, the outside edge 11 of the multiple sections 10 can have edge molding 9 attached, preferably with contact cement. Preferably the edge molding is of closed cell foam, similar or identical to the mat 2. Preferably, a hook and pile fastener such as 3M Velcro® is affixed to at least one perimeter edge of each individual assembly for detachably attaching multiple sections of the carpet mat assembly into a unit.

Figure 3:
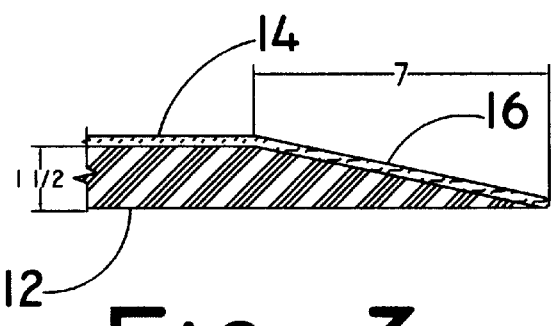
FIG. 3 is a partial cross section view of a shock absorbing carpet mat assembly of 1½ in thick mat with a tapered edge on the mat.

FIG. 3 is a partial cross section view of a shock absorbing carpet mat assembly of 1½ inches thickness mat with a tapered edge on the mat. Mat 12 is 1½ inches thick. Carpet 14, can be made liquid proof by the application of a liquid polyurethane to the bottom side, then a woven cloth is applied over the polyurethane. The treated bottom side of the carpet is glued by any suitable glue to the mat 12. The width of the taper illustrated is 7 inches. Tests have shown that the closed cell foam mat of 1½ inch thickness will conform to the ASTM F-1292-99 Standard Specification for Impact Attenuation of surface Systems Under and Around Playground Equipment for a 72 inch fall. I have found that a 7 inch width of taper to 1½ in thickness to be a 4.67 ratio which is a good thickness to width ratio for the edge taper for a mat assembly. It is a gentle enough taper to reduce unexpected contact with the carpet when walking onto the edge of the carpet assembly. This width preferably is between 4 and 5 times the thickness, although it may vary between 1 and 12 times the thickness.

Figure 4:
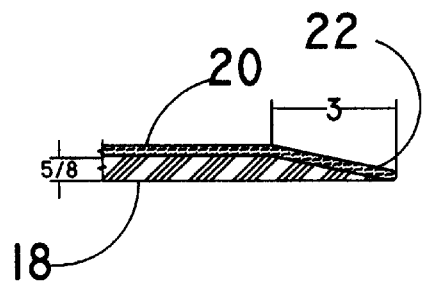
FIG. 4 is a partial cross section view of a shock absorbing carpet mat assembly of ⅝ in thick mat with a tapered edge on the mat.

FIG. 4 is a partial cross section view of a shock absorbing carpet mat assembly of ⅝ in thick mat with a tapered edge on the mat. Mat 18 is ⅝ inches thick. Carpet 20, can be made liquid proof by the application of a liquid polyurethane (not shown) to the bottom side, then a woven cloth (not shown) is applied and adhered to the polyurethane. The treated bottom side of the carpet is glued by any suitable glue to the mat 18. Tests have shown that the closed cell foam mat of ⅝ inch thickness will conform to the ASTM F-1292-99 Standard Specification for Impact Attenuation of surface Systems Under and Around Playground Equipment for a 24 inch fall. The width illustrated of the taper is 3 inches for the ⅝ inch thick mat. I have found that a 3 inch width of taper to ⅝ inch thickness to be a 4.80 ratio which is a good width to thickness ratio for the edge taper for a mat assembly. It is a gentle enough taper to reduce unexpected contact with the carpet when walking onto the edge of the carpet assembly. This width preferably is between 4 and 5 times the thickness, although it may vary between 1 and 12 times the thickness.

Figure 5:
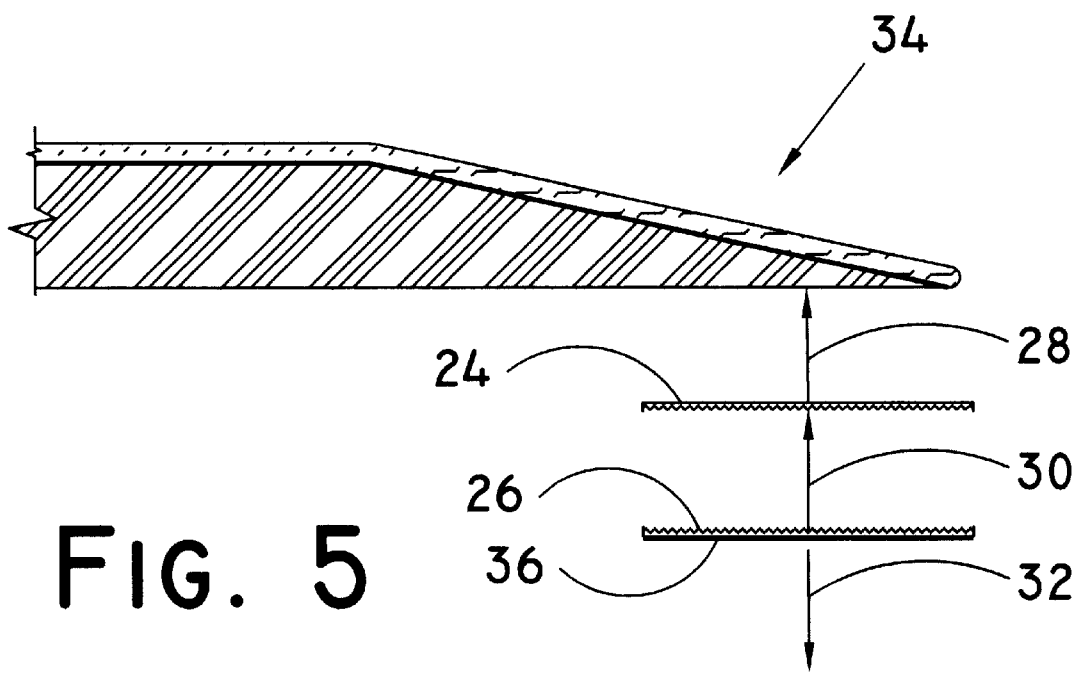
FIG. 5 is a partial cross section view of a shock absorbing carpet mat assembly of 1½ in thick mat with a tapered edge on the mat and showing a hook and loop fastening system to anchor the mat assembly.

FIG. 5 is a partial cross section view of a shock absorbing carpet mat 24 assembly of 1½ in thick mat with a tapered edge on the mat and showing a hook and loop fastening system to anchor the mat assembly. In this preferred method, a carpet assembly as described in FIG. 3 or 4 may be secured to a floor in an easy and convenient fashion. A hook and loop fastener system such as 3M Velcro® with a pressure sensitive adhesive on the outer surfaces of the fastener portions is utilized. The hook and loop fastener portiones are assembled in mating and aligned relationship. The hook portion 24 of fastener is adhered to the bottom side of the mat in carpet assembly 34 in the location illustrated by arrow 28. The hook portion 24 of fastener may be adhered to the bottom side of the mat in carpet assembly 34 with pressure sensitive or other adhesive. The loop portion 26 of the hook and loop fastener is matingly positioned in engagement with hook porion 24. Then the carpet assembly is placed in the position where it is desired to be affixed as illustrated by arrow 32. The protective film 36 is removed from the loop portion of the fastener system and the mat is affixed to the floor. Foot pressure may be used to insure adherence of the loop portion to the floor. Then the carpet assembly may be removed, leaving the relatively smooth loop portion of the fastener system in place on the floor. The carpet assembly may then be repositioned and held at the same location on the floor.

I am disclosing a carpet assembly with shock absorbing properties for preventing injury comprising; a mat of closed cell foam composition having shock damping properties and having a top side and a bottom side and predetermined thickness and perimeter edges connecting said top side and said bottom side; a layer of adhesive which may be pressure sensitive adhesive covering the top side of the mat, a layer of carpet having a top side and a bottom side, the bottom side of the carpet being fastened in contact with the pressure sensitive adhesive for adherence thereto. I am further disclosing a carpet mat assembly having a removable liner covering a pressure sensitive adhesive on the top side of the mat to protect the pressure sensitive adhesive from contact with any other surface, prior to fastening the carpet to the mat.

Although the taper illustrated in FIGS. 3, 4 and 5 have a straight line profile, for the purposes of this specification, taper includes variations from the straight line comprising convex curves, concave curves, combinations of these curves and combinations of these curves with straight line elements.

Although elements of the invention have been illustrated in the accompanying drawings and described in the foregoing description it will be understood that the invention is not limited to the embodiments disclosed, but is capable of rearrangements, modifications, substitutions and reversals of parts and elements without departing from the spirit of the invention.

I claim:

1. A carpet assembly with shock absorbing properties comprising;

a mat of closed cell foam composition having shock damping properties and having a top side and a bottom side and a thickness not less than substantially ⅝ inch and perimeter edges connecting said top side and said bottom side;

a layer of adhesive covering the top side of the mat;

a layer of carpet having a top side and a bottom side, the bottom side of the carpet being fastened in contact with the adhesive for adherence thereto;

wherein the mat has an edge of closed cell foam forming least one perimeter edge of the carpet mat; and wherein the edge of closed cell foam has a decreasing thickness, the width of the decreasing thickness is 1 to 12 times the thickness of the mat.

2. A carpet mat assembly according to claim 1, wherein the edge of closed cell foam has a decreasing thickness, the width of the decreasing thickness is 4 to 5 times the thickness of the mat.

\* \* \* \* \*

(12) EX PARTE REEXAMINATION CERTIFICATE (7899th)
United States Patent
Kanter

(10) Number: US 6,572,952 C1
(45) Certificate Issued: Nov. 30, 2010

(54) SHOCK ABSORBING CARPET SYSTEM

(76) Inventor: Ray D. Kanter, 10723 Preston Rd. #243, Dallas, TX (US) 75230

Reexamination Request:
No. 90/009,132, May 2, 2008

Reexamination Certificate for:
Patent No.: 6,572,952
Issued: Jun. 3, 2003
Appl. No.: 09/617,206
Filed: Jul. 17, 2000

Related U.S. Application Data

(63) Continuation-in-part of application No. 08/971,524, filed on Nov. 17, 1997, now Pat. No. 6,090,462.

(51) Int. Cl.
*A47G 27/02* (2006.01)
*A47G 27/04* (2006.01)
*A47G 27/00* (2006.01)
*B32B 5/18* (2006.01)
*D06N 7/00* (2006.01)

(52) U.S. Cl. .................. 428/192; 296/39.1; 296/39.2; 428/194; 428/95; 428/96

(58) Field of Classification Search .................. None
See application file for complete search history.

(56) References Cited

U.S. PATENT DOCUMENTS 3,577,894 A    5/1971   Emerson, Jr. et al.
3,616,138 A   10/1971   Wentworth et al.
4,522,857 A    6/1985   Higgins
5,645,914 A *  7/1997   Horowitz ..................... 428/81

OTHER PUBLICATIONS

Americans with Disabilities Act: Accessibility Guidelines for Buildings and Facilities, Appendix A to Part 1191; U.S. Architectural and Transportation Barreirs Compliance Board; pp. 1, 16, 31, 92–94 (date unknown).

* cited by examiner

*Primary Examiner*—Alan Diamond

(57) ABSTRACT

A carpet mat assembly with shock absorbing properties includes a mat made of closed cell foam sections. The mat sections are sized to be readily portable, preferably 4 foot by 6 foot in size. The mat thickness is selected to conform to ASTM F1292-99. Preferably, the mat thickness is 1⅛" thick. The mat section may be coated with a pressure sensitive adhesive covering on one side of the mat. The pressure sensitive adhesive is covered with a removable liner. The liner is removed to expose the pressure sensitive adhesive. Carpet is applied to the coated surface of the mat and the pressure sensitive adhesive bonds the carpet to the mat. The outer perimeters of each mat may be lined with a hook and pile fastener such as 3M Velcro® for attaching multiple sections of the carpet mat assembly securely together. On the outer perimeter of mat sections not joined to other mat sections, an edge molding preferably made from the same closed cell foam may be integral, or may be attached to the mat with a contact adhesive, or by other means. The completed assembly provides a floor or ground surface safe for playgrounds, schools, child care centers, martial arts, gymnasiums or other areas where shock absorbing surfaces are required.

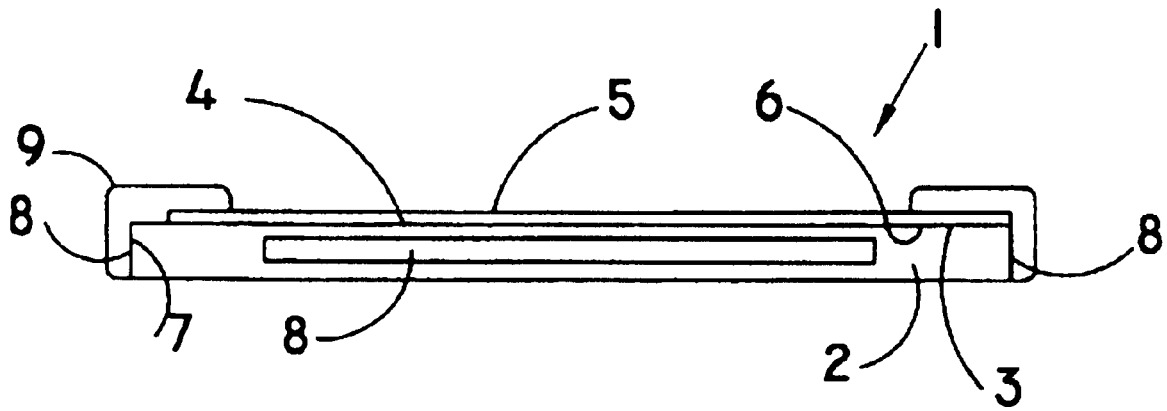

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentbale as amended.

New claims 3 and 4 are added and determined to be patentable.

1. A carpet assembly with shock absorbing properties comprising;
    a mat of closed cell foam composition having shock damping properties and having a top side and a bottom side and a thickness not less than substantially ⅝ inch and perimeter edges connecting said top side and said bottom side;
    a layer of adhesive covering the top side of the mat;
    a layer of carpet having a top side and a bottom side, the bottom side of the carpet being fastened in contact with the adhesive for adherence thereto;
    [wherein the mat has] an edge *molding formed* of *exposed* closed cell foam[forming least one perimeter edge of the carpet mat; and], *the edge molding affixed to the mat,* wherein the edge [of closed cell foam] *molding* has a decreasing thickness, the width of the decreasing thickness is 1 to 12 times the thickness of the mat, *and the edge molding forms at least one perimeter edge of the carpet assembly.*

2. A carpet [mat] assembly according to claim 1, wherein the edge [of closed cell foam] *molding* has a decreasing thickness, the width of the decreasing thickness is 4 to 5 times the thickness of the mat.

*3. The carpet assembly according to claim 1, wherein the thickness of the mat is about ⅝ inch.*

*4. The carpet assembly according to claim 1, wherein the thickness of the mat is greater than 1.5 inches.*

* * * * *